United States Patent
Lin et al.

(10) Patent No.: US 12,494,666 B2
(45) Date of Patent: Dec. 9, 2025

(54) SOFT START CIRCUIT OF UPS RELAY

(71) Applicant: Vertiv Corporation, Westerville, OH (US)

(72) Inventors: Shaoqiang Lin, Guangdong (CN); Wei Xu, Guangdong (CN); Xiaolu Guo, Guangdong (CN); Ying Wang, Guangdong (CN)

(73) Assignee: VERTIV CORPORATION, Westerville, OH (US)

( * ) Notice: Subject to any disclaimer, the term of this patent is extended or adjusted under 35 U.S.C. 154(b) by 73 days.

(21) Appl. No.: 18/487,904

(22) Filed: Oct. 16, 2023

(65) Prior Publication Data

US 2024/0195210 A1 Jun. 13, 2024

(30) Foreign Application Priority Data

Dec. 8, 2022 (CN) .......................... 202223293459.4

(51) Int. Cl.
  *H02J 7/00* (2006.01)
  *H02J 9/06* (2006.01)
  *H02M 1/42* (2007.01)

(52) U.S. Cl.
  CPC .............. *H02J 9/06* (2013.01); *H02J 7/0069* (2020.01); *H02M 1/4208* (2013.01)

(58) Field of Classification Search
  CPC .. H02J 9/06; H02J 7/0069; H02J 9/061; H02J 7/00; H02M 1/4208; H02M 1/32; H02M 7/219; H02M 1/36; H02M 1/4216; H02M 1/42; H02H 9/001
  USPC .......................................................... 307/66
  See application file for complete search history.

(56) References Cited

U.S. PATENT DOCUMENTS

2014/0111005 A1    4/2014   Liu et al.

FOREIGN PATENT DOCUMENTS

| CN | 102231604   | * | 11/2011 |
| CN | 102231604 A |   | 11/2011 |
| CN | 102593945   | * | 7/2012  |
| CN | 102593945 A |   | 7/2012  |
| CN | 105305802 A |   | 2/2016  |

OTHER PUBLICATIONS

Extended European Search Report regarding Application No. 23201720.2, dated Apr. 19, 2024.

* cited by examiner

*Primary Examiner* — Rexford N Barnie
*Assistant Examiner* — Xuan Ly
(74) *Attorney, Agent, or Firm* — Harness, Dickey & Pierce, P.L.C.

(57) ABSTRACT

A soft start circuit of a UPS relay includes a three-phase pre-charging module, a first PFC module, a second PFC module, a relay module, a three-phase input voltage detection module, a bus voltage detection module and a relay control module. The relay control module is electrically connected to the three-phase input voltage detection module and the bus voltage detection module and controls the connection of the relay module, to control part of relays in the relay module to be turned on based on the A-phase input voltage, the B-phase input voltage, the C-phase input voltage and the bus voltage to soft start the relay. The relay can be safely turned on without being damaged by an impact current in a case that an input voltage is unbalanced.

13 Claims, 4 Drawing Sheets

SOFT START CIRCUIT OF UPS RELAY

CROSS-REFERENCE TO RELATED APPLICATION

This application claims the benefit and priority of Chinese Application No. 202223293459.4 filed on Dec. 8, 2022, the entire disclosure of which is incorporated herein by reference.

FIELD

The present disclosure relates to an Uninterruptible Power Supply (UPS), and more particularly to a soft start circuit of a UPS relay.

BACKGROUND

A basic structure of a UPS system includes a rectifier, a charger and an inverter, where the rectifier converts an alternating current into a direct current, and the inverter converts the direct current converted by the rectifier into an alternating current. At an input end of the rectifier of the UPS system, a thyristor or a relay is generally used to perform an soft start control on an input. Since the thyristor is easy to be damaged, in a high efficiency UPS with medium and small power, the relay is generally used to control an input of the rectifier. In order to avoid the damage caused by an impact current in a case that the relay is turned on, at present, the relay is turned on near a zero-crossing point of an input voltage or the relay is turned on by controlling a voltage difference across the relay in a reliable range through a soft start circuit. However, in a case that the relay is turned on near the zero-crossing point of the input voltage through the soft start circuit, it is limited by action time of the relay. Since operation time periods in which the relays are turned on are different, some relays cannot be ensured to be turned on at the zero-crossing point of the input voltage. In a case that the relay is turned on by controlling the voltage difference across the relay in the reliable range through the soft start circuit, a voltage across the relay cannot be ensured to be within a normal range in a case that an input three-phase voltage is unbalanced. Therefore, the relay may not be turned on since the voltage across the relay is out of range.

SUMMARY

In view of the above defects of the conventional technology, the technical problem to be solved by the present disclosure is to provide a soft start circuit of a UPS relay in which a relay can be safely turned on without being damaged by an impact current in a case that an input voltage is unbalanced.

To solve the above technical problem, the following technical solution is provided according to the present disclosure. A soft start circuit of a UPS relay is provided, which includes a three-phase pre-charging module, a first Power Factor Correction (PFC) module, a second PFC module, a relay module, a three-phase input voltage detection module, a bus voltage detection module and a relay control module.

A first end of the relay module is connected to an A-phase mains input, a B-phase mains input and a C-phase mains input respectively, a second end of the relay module is connected to the first PFC module, and a third end of the relay module is connected to the second PFC module. The first PFC module and the second PFC module are connected to a positive bus, a negative bus and an N line respectively. A first end of the three-phase pre-charging module is connected to the A-phase mains input, the B-phase mains input and the C-phase mains input respectively, and a second end of the three-phase pre-charging module is connected to the positive bus and the negative bus respectively.

The three-phase input voltage detection module is connected to the A-phase mains input, the B-phase mains input and the C-phase mains input respectively to detect an A-phase input voltage, a B-phase input voltage and a C-phase input voltage.

The bus voltage detection module is connected to the positive bus and the negative bus to detect a bus voltage.

The relay control module is electrically connected to the three-phase input voltage detection module and the bus voltage detection module and controls the connection of the relay module, to control part of relays in the relay module to be turned on based on the A-phase input voltage, the B-phase input voltage, the C-phase input voltage and the bus voltage to soft start the relay.

In the soft start circuit of the UPS relay according to the present disclosure, the relay module includes a first relay, a second relay, a third relay, a fourth relay, a fifth relay and a sixth relay. The first PFC module includes a first A-phase PFC unit, a first B-phase PFC unit and a first C-phase PFC unit. The second PFC module includes a second A-phase PFC unit, a second B-phase PFC unit and a second C-phase PFC unit.

A first end of the first A-phase PFC unit is connected to the A-phase mains input via the first relay, a second end of the first A-phase PFC unit is connected to the N line, a third end of the first A-phase PFC unit is connected to the positive bus, and a fourth end of the first A-phase PFC unit is connected to the negative bus. A first end of the first B-phase PFC unit is connected to the B-phase mains input via the second relay, a second end of the first B-phase PFC unit is connected to the N line, a third end of the first B-phase PFC unit is connected to the positive bus, and a fourth end of the first B-phase PFC unit is connected to the negative bus. A first end of the first C-phase PFC unit is connected to the C-phase mains input via the third relay, a second end of the first C-phase PFC unit is connected to the N line, a third end of the first C-phase PFC unit is connected to the positive bus, and a fourth end of the first C-phase PFC unit is connected to the negative bus. A first end of the second A-phase PFC unit is connected to the A-phase mains input via the fourth relay, a second end of the second A-phase PFC unit is connected to the N line, a third end of the second A-phase PFC unit is connected to the negative bus, and a fourth end of the second A-phase PFC unit is connected to the positive bus. A first end of the second B-phase PFC unit is connected to the B-phase mains input via the fifth relay, a second end of the second B-phase PFC unit is connected to the N line, a third end of the second B-phase PFC unit is connected to the negative bus, and a fourth end of the second B-phase PFC unit is connected to the positive bus. A first end of the second C-phase PFC unit is connected to the C-phase mains input via the sixth relay, a second end of the second C-phase PFC unit is connected to the N line, a third end of the second C-phase PFC unit is connected to the negative bus, and a fourth end of the second C-phase PFC unit is connected to the positive bus.

The relay control module is electrically connected to the three-phase input voltage detection module and the bus voltage detection module and controls the connection of the first relay and the fourth relay, the second relay and the fifth relay, and the third relay and the sixth relay, to control the first relay and the fourth relay, the second relay and the fifth relay, and the third relay and the sixth relay to be turned on based on the A-phase input voltage, the B-phase input voltage, the C-phase input voltage and the bus voltage.

In the soft start circuit of the UPS relay according to the present disclosure, the three-phase pre-charging module includes a first diode, a second diode, a third diode, a fourth diode, a fifth diode, a sixth diode, a seventh relay and an eighth relay. An anode of the first diode is connected to the A-phase mains input and a cathode of the fourth diode. A cathode of the first diode is connected to a cathode of the second diode, a cathode of the third diode and a first end of the seventh relay. An anode of the second diode is connected to the B-phase mains input and a cathode of the fifth diode. An anode of the third diode is connected to the C-phase mains input and a cathode of the sixth diode. An anode of the fourth diode is connected to an anode of the fifth diode, an anode of the sixth diode and a first end of the eighth relay. A second end of the seventh relay is connected to the positive bus. A second end of the eighth relay is connected to the negative bus.

In the soft start circuit of the UPS relay according to the present disclosure, the first A-phase PFC unit includes a first inductor, a seventh diode, an eighth diode, a first switch tube and a second switch tube. A first end of the first inductor is connected to the first relay. A second end of the first inductor is connected to an anode of the seventh diode, a cathode of the eighth diode and a source of the first switch tube. A drain of the first switch tube is connected to a drain of the second switch tube. A source of the second switch tube is connected to the N line. A cathode of the seventh diode is connected to the positive bus. An anode of the eighth diode is connected to the negative bus.

In the soft start circuit of the UPS relay according to the present disclosure, the first B-phase PFC unit includes a second inductor, a ninth diode, a tenth diode, a third switch tube and a fourth switch tube. A first end of the second inductor is connected to the second relay. A second end of the second inductor is connected to an anode of the ninth diode, a cathode of the tenth diode and a source of the third switch tube. A drain of the third switch tube is connected to a drain of the fourth switch tube. A source of the fourth switch tube is connected to the N line. A cathode of the ninth diode is connected to the positive bus. An anode of the tenth diode is connected to the negative bus.

In the soft start circuit of the UPS relay according to the present disclosure, the first C-phase PFC unit includes a third inductor, an eleventh diode, a twelfth diode, a fifth switch tube and a sixth switch tube. A first end of the third inductor is connected to the third relay. A second end of the third inductor is connected to an anode of the eleventh diode, a cathode of the twelfth diode and a source of the fifth switch tube. A drain of the fifth switch tube is connected to a drain of the sixth switch tube. A source of the sixth switch tube is connected to the N line. A cathode of the eleventh diode is connected to the positive bus. An anode of the twelfth diode is connected to the negative bus.

In the soft start circuit of the UPS relay according to the present disclosure, the second A-phase PFC unit includes a fourth inductor, a thirteenth diode, a fourteenth diode, a seventh switch tube and an eighth switch tube. A first end of the fourth inductor is connected to the fourth relay. A second end of the fourth inductor is connected to an anode of the thirteenth diode, a cathode of the fourteenth diode and a source of the seventh switch tube. A drain of the seventh switch tube is connected to a drain of the eighth switch tube. A source of the eighth switch tube is connected to the N line. A cathode of the thirteenth diode is connected to the positive bus. An anode of the fourteenth diode is connected to the negative bus.

In the soft start circuit of the UPS relay according to the present disclosure, the second B-phase PFC unit includes a fifth inductor, a fifteenth diode, a sixteenth diode, a ninth switch tube and a tenth switch tube. A first end of the fifth inductor is connected to the fifth relay. A second end of the fifth inductor is connected to an anode of the fifteenth diode, a cathode of the sixteenth diode and a source of the ninth switch tube. A drain of the ninth switch tube is connected to a drain of the tenth switch tube. A source of the tenth switch tube is connected to the N line. A cathode of the fifteenth diode is connected to the positive bus. An anode of the sixteenth diode is connected to the negative bus.

In the soft start circuit of the UPS relay according to the present disclosure, the second C-phase PFC unit includes a sixth inductor, a seventeenth diode, an eighteenth diode, an eleventh switch tube and a twelfth switch tube. A first end of the sixth inductor is connected to the sixth relay. A second end of the sixth inductor is connected to an anode of the seventeenth diode, a cathode of the eighteenth diode and a source of the eleventh switch tube. A drain of the eleventh switch tube is connected to a drain of the twelfth switch tube. A source of the twelfth switch tube is connected to the N line. A cathode of the seventeenth diode is connected to the positive bus. An anode of the eighteenth diode is connected to the negative bus.

The soft start circuit of the UPS relay according to the present disclosure further includes a battery starting module. The battery starting module includes a battery power supply, a ninth relay, a tenth relay, an eleventh relay, a twelfth relay, a thirteenth relay and a fourteenth relay. A first end of the ninth relay, the tenth relay and the eleventh relay is connected to a positive electrode of the battery power supply. A first end of the twelfth relay, the thirteenth relay and the fourteenth relay is connected to a negative electrode of the battery power supply. A second end of the ninth relay is connected to a second end of the first relay, a second end of the tenth relay is connected to a second end of the second relay, a second end of the eleventh relay is connected to a second end of the third relay, a second end of the twelfth relay is connected to a second end of the fourth relay, a second end of the thirteenth relay is connected to a second end of the fifth relay, and a second end of the fourteenth relay is connected to a second end of the sixth relay.

In the soft start circuit of the UPS relay according to the present disclosure, the relay control module includes a first comparator, a second comparator and a relay controller. An input end of the first comparator receives the A-phase input voltage, the B-phase input voltage and the C-phase input voltage to output a first comparison result, and an input end of the second comparator is connected to the A-phase input voltage, the B-phase input voltage, the C-phase input voltage and the bus voltage to output a second comparison result.

The relay controller controls the first relay and the fourth relay, the second relay and the fifth relay, and the third relay and the sixth relay to be turned on simultaneously or at intervals based on the first comparison result and the second comparison result.

In implementing the soft start circuit of the UPS relay according to the present disclosure, by detecting a three-phase input voltage and a bus voltage and turning on a relay arranged in a three-phase circuit based on a detection result, the relay can be safely turned on without being damaged by an impact current in a case that an input voltage is unbalanced.

BRIEF DESCRIPTION OF THE DRAWINGS

The present disclosure is further illustrated hereinafter in conjunction with the accompanying drawings and embodiments. In the drawings.

DETAILED DESCRIPTION OF EMBODIMENTS

In order to make objects, technical solutions and advantages of the present disclosure clearer, the present disclosure is further described in detail hereinafter in conjunction with drawings and embodiments. It should be understood that the specific embodiments described herein are used only to explain the present disclosure and are not intended to limit the present disclosure.

Figure 1:
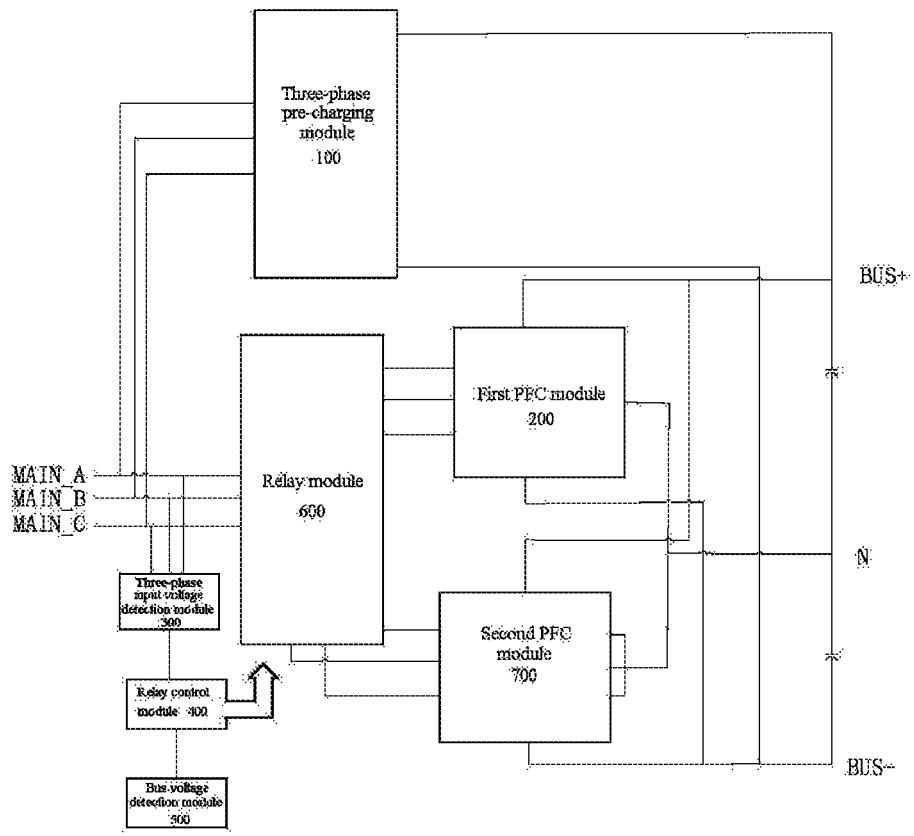
FIG. 1 is a functional block diagram of a soft start circuit of a UPS relay according to a preferred embodiment of the present disclosure.

FIG. 1 is a functional block diagram of a soft start circuit of a UPS relay according to a preferred embodiment of the present disclosure. The soft start circuit of the UPS relay includes a three-phase pre-charging module 100, a first PFC module 200, a second PFC module 700, a relay module 600, a three-phase input voltage detection module 300, a bus voltage detection module 500 and a relay control module 400.

A first end of the relay module 600 is connected to an A-phase mains input, a B-phase mains input and a C-phase mains input respectively, a second end of the relay module 600 is connected to the first PFC module 200, and a third end of the relay module 600 is connected to the second PFC module 700. The first PFC module 200 and the second PFC module 700 are connected to a positive bus BUS+, a negative bus BUS− and an N line respectively. A first end of the three-phase pre-charging module 100 is connected to the A-phase mains input, the B-phase mains input and the C-phase mains input respectively, and a second end of the three-phase pre-charging module 100 is connected to the positive bus BUS+ and the negative bus BUS− respectively. The three-phase input voltage detection module is connected to the A-phase mains input, the B-phase mains input and the C-phase mains input respectively to detect an A-phase input voltage, a B-phase input voltage and a C-phase input voltage. The bus voltage detection module 500 is connected to the positive bus BUS+ and the negative bus BUS− to detect a bus voltage. The relay control module 400 is electrically connected to the three-phase input voltage detection module 300 and the bus voltage detection module 500 and controls the connection of the relay module 600, to control part of relays in the relay module 600 to be turned on based on the A-phase input voltage, the B-phase input voltage, the C-phase input voltage and the bus voltage to soft start the relay.

In a normal working condition in which a three-phase input voltage is balanced, the three-phase pre-charging module 100 starts a mains supply, and the uncontrolled rectification is realized with the whole circuit. In order to avoid being damaged by a current impact when an input relay is turned on, in a case that a voltage difference between a peak voltage of the A-phase input voltage, the B-phase input voltage and the C-phase input voltage detected by the three-phase input voltage detection module 300 and the bus voltage detected by the bus voltage detection module 500 is within a set range, a three-phase relay is turned on by the relay control module 400, and a PFC wave generation control is performed, so that a bus is boosted to a set range, to realize a soft start.

In a case that a three-phase input voltage is unbalanced, the three-phase pre-charging module 100 starts a mains supply, and the uncontrolled rectification is realized with the whole circuit. Since the three-phase input voltage is unbalanced, a condition that a voltage difference between a peak voltage of the A-phase input voltage, the B-phase input voltage and the C-phase input voltage and the bus voltage detected by the bus voltage detection module 500 is within a set range may not be reached. At this time, the relay control module 400 selects a relay corresponding to one phase of the A-phase input voltage, the B-phase input voltage and the C-phase input voltage with a lowest voltage amplitude to be turned on based on the detected A-phase input voltage, B-phase input voltage and C-phase input voltage. In this way, compared with the conventional technology with which it is impossible to start or a direct start-up causes an impact on a relay, a body diode of a PFC and a bus capacitor since the input voltage has a relatively wide unbalance range, with the soft start circuit of the UPS relay according to the present disclosure, the above-mentioned impact current can be reduced, and impact currents of two phases of PFC circuits with higher input voltages can be ensured to be zero, thus greatly improving the reliability of soft start.

Figure 2:
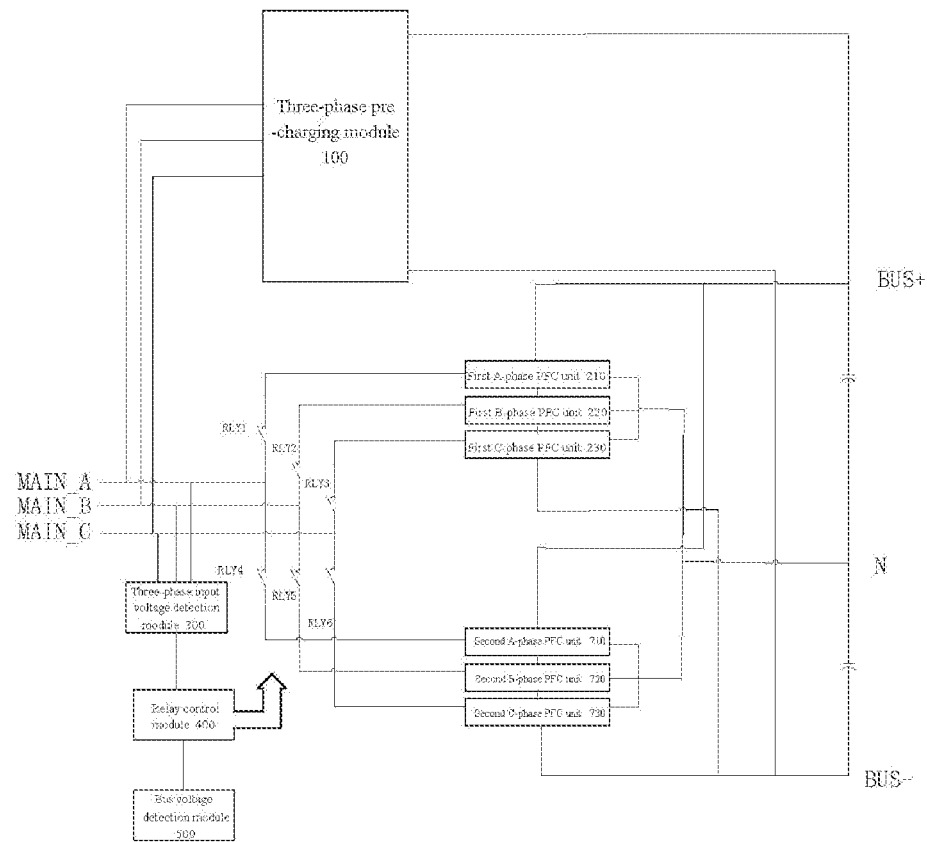
FIG. 2 is a functional block diagram of a soft start circuit of a UPS relay according to another preferred embodiment of the present disclosure.

FIG. 2 is a functional block diagram of a soft start circuit of a UPS relay according to a preferred embodiment of the present disclosure. As shown in FIG. 2, the soft start circuit of the UPS relay according to the present disclosure includes a three-phase pre-charging module 100, a first A-phase PFC unit 210, a second A-phase PFC unit 710, a first B-phase PFC unit 220, a second B-phase PFC unit 720, a first C-phase PFC unit 230, a second C-phase PFC unit 730, a relay RLY1, a relay RLY2, a relay RLY3, a relay RLY4, a relay RLY5, a relay RLY6, a three-phase input voltage detection module 300, a bus voltage detection module 500 and a relay control module 400.

As shown in FIG. 2, a first end of the first A-phase PFC unit 210 is connected to the A-phase mains input MAIN_A via the relay RLY1, a second end of the first A-phase PFC unit 210 is connected to the N line, a third end of the first A-phase PFC unit 210 is connected to the positive bus BUS+, and a fourth end of the first A-phase PFC unit 210 is connected to the negative bus BUS−. A first end of the first B-phase PFC unit 220 is connected to the B-phase mains input MAIN_B via the relay RLY2, a second end of the first B-phase PFC unit 220 is connected to the N line, a third end of the first B-phase PFC unit 220 is connected to the positive bus BUS+, and a fourth end of the first B-phase PFC unit 220 is connected to the negative bus BUS−. A first end of the first C-phase PFC unit 230 is connected to the C-phase mains input MAIN_C via the relay RLY3, a second end of the first C-phase PFC unit 230 is connected to the N line, a third end of the first C-phase PFC unit 230 is connected to the positive bus BUS+, and a fourth end of the first C-phase PFC unit 230 is connected to the negative bus BUS−. A first end of the second A-phase PFC unit 710 is connected to the A-phase mains input MAIN_A via the relay RLY4, a second end of the second A-phase PFC unit 710 is connected to the N line, a third end of the second A-phase PFC unit 710 is connected to the negative bus BUS−, and a fourth end of the second A-phase PFC unit 710 is connected to the positive bus BUS+. A first end of the second B-phase PFC unit 720 is connected to the B-phase mains input MAIN_B via the relay RLY5, a second end of the second B-phase PFC unit 720 is connected to the N line, a third end of the second B-phase PFC unit 720 is connected to the negative bus BUS−, and a fourth end of the second B-phase PFC unit 720 is connected to the positive bus BUS+. A first end of the second C-phase PFC unit 730 is connected to the C-phase mains input MAIN_C via the relay RLY6, a second end of the second C-phase PFC unit 730 is connected to the N line, a third end of the second C-phase PFC unit 730 is connected to the negative bus BUS−, and a fourth end of the second C-phase PFC unit 730 is connected to the positive bus BUS+.

As shown in FIG. 2, a first end of the three-phase pre-charging module 100 is connected to the A-phase mains input MAIN_A, the B-phase mains input MAIN_B and the C-phase mains input MAIN_C respectively, and a second end of the three-phase pre-charging module 100 is connected to the positive bus BUS+ and the negative bus BUS− respectively.

The three-phase input voltage detection module 300 is connected to the A-phase mains input MAIN_A, the B-phase mains input MAIN_B and the C-phase mains input MAIN_C respectively to detect an A-phase input voltage, a B-phase input voltage and a C-phase input voltage. The bus voltage detection module 500 is connected to the positive bus BUS+ and the negative bus BUS− to detect a bus voltage.

The relay control module 400 is electrically connected to the three-phase input voltage detection module 300 and the bus voltage detection module 500 and controls the connection of the relay RLY1 and the relay RLY4, the relay RLY2 and the relay RLY5, and the relay RLY3 and the relay RLY6, to control the relay RLY1 and the relay RLY4, the relay RLY2 and the relay RLY5, and the relay RLY3 and the relay RLY6 to be turned on respectively, based on the A-phase input voltage, the B-phase input voltage, the C-phase input voltage and the bus voltage.

In the preferred embodiment of the present disclosure, the three-phase pre-charging module 100 may include any suitable rectification starting circuit. For example, the three-phase pre-charging module 100 may include a half-bridge or full-bridge rectification module and a switching device connected to an output end of the half-bridge or full-bridge rectification module.

In the preferred embodiment of the present disclosure, the first A-phase PFC unit 210, the second A-phase PFC unit 710, the first B-phase PFC unit 220, the second B-phase PFC unit 720, the first C-phase PFC unit 230 and the second C-phase PFC unit 730 are preferably the same PFC units. For example, they may include any suitable PFC circuit or module, preferably an embodiment shown in FIG. 3.

In the preferred embodiment of the present disclosure, the three-phase input voltage detection module 300 and the bus voltage detection module 500 may be realized by using any suitable detection circuit such as detection resistance, or by directly using a multimeter or a single chip microcomputer such as ADC0809.

In the preferred embodiment of the present disclosure, the relay control module 400 may be realized by using a relay controller matched with a type of the relay, such as Siemens SMART controller CPUSR60 and the like. The relay control module 400 controls the relay RLY1 and the relay RLY4, the relay RLY2 and the relay RLY5, and the relay RLY3 and the relay RLY6 to be turned on simultaneously or sequentially based on the A-phase input voltage, the B-phase input voltage, the C-phase input voltage and the bus voltage.

In another preferred embodiment of the present disclosure, the relay control module 400 may include a first comparator, a second comparator and a relay controller. An input end of the first comparator receives the A-phase input voltage, the B-phase input voltage and the C-phase input voltage to output a first comparison result, and an input end of the second comparator is connected to the A-phase input voltage, the B-phase input voltage, the C-phase input voltage and the bus voltage to output a second comparison result. The relay controller controls the relay RLY1 and the relay RLY4, the relay RLY2 and the relay RLY5, and the relay RLY3 and the relay RLY6 to be turned on simultaneously or sequentially based on the first comparison result and the second comparison result. Here, the first comparator and the second comparator may be any suitable comparison circuit or chip, such as LM741, LM339 and the like, which is not repeated here.

In a further preferred embodiment of the present disclosure, the specific control process may be as follows.

In a normal working condition in which a three-phase input voltage is balanced, the three-phase pre-charging module 100 starts a mains supply, and the uncontrolled rectification is realized with the whole circuit. In order to avoid being damaged by a current impact when an input relay is turned on, in a case that a voltage difference between a peak voltage of the A-phase input voltage, the B-phase input voltage and the C-phase input voltage detected by the three-phase input voltage detection module 300 and the bus voltage detected by the bus voltage detection module 500 is within a set range, a three-phase relay is turned on by the relay control module 400, i.e., the relay RLY1 and the relay RLY4, the relay RLY2 and the relay RLY5, and the relay RLY3 and the relay RLY6 are controlled to be turned on simultaneously, and a PFC wave generation control is performed, so that a bus is boosted to a set range, to realize a soft start.

In a case that a three-phase input voltage is unbalanced, the three-phase pre-charging module 100 starts a mains supply, and the uncontrolled rectification is realized with the whole circuit. Since the three-phase input voltage is unbalanced, a condition that a voltage difference between a peak voltage of the A-phase input voltage, the B-phase input voltage and the C-phase input voltage and the bus voltage detected by the bus voltage detection module 500 is within a set range may not be reached. At this time, the relay control module 400 selects a relay corresponding to one phase of the A-phase input voltage, the B-phase input voltage and the C-phase input voltage with a lowest voltage amplitude to be turned on based on the detected A-phase input voltage, B-phase input voltage and C-phase input voltage. For example, if the A-phase input voltage is the lowest, the relay RLY1 and the relay RLY4 are selected to be controlled to be turned on. If the B-phase input voltage is the lowest, the relay RLY2 and the relay RLY5 are selected to be controlled to be turned on. If the C-phase input voltage is the lowest, the relay RLY3 and the relay RLY6 are selected to be controlled to be turned on. Then, a PWM control is performed on the phase, and the bus voltage is boosted to a preset value. Here, for the PWM control process, any known control process in the conventional technology may be adopted. Then, after the bus voltage detection module 500 detects that the bus voltage is greater than the three-phase input voltage (i.e., the detected A-phase input voltage, B-phase input voltage and C-phase input voltage), relays corresponding to the remaining two phases are turned on. The preset value may be determined according to actual situations.

In this way, compared with the conventional technology with which it is impossible to start or a direct start-up causes an impact on a relay, a body diode of a PFC and a bus capacitor since the input voltage has a relatively wide unbalanced range, with the soft start circuit of the UPS relay according to the present disclosure, the above-mentioned impact current can be reduced, and impact currents of two phases of PFC circuits with higher input voltages can be ensured to be zero, thus greatly improving the reliability of soft start.

Figure 3:
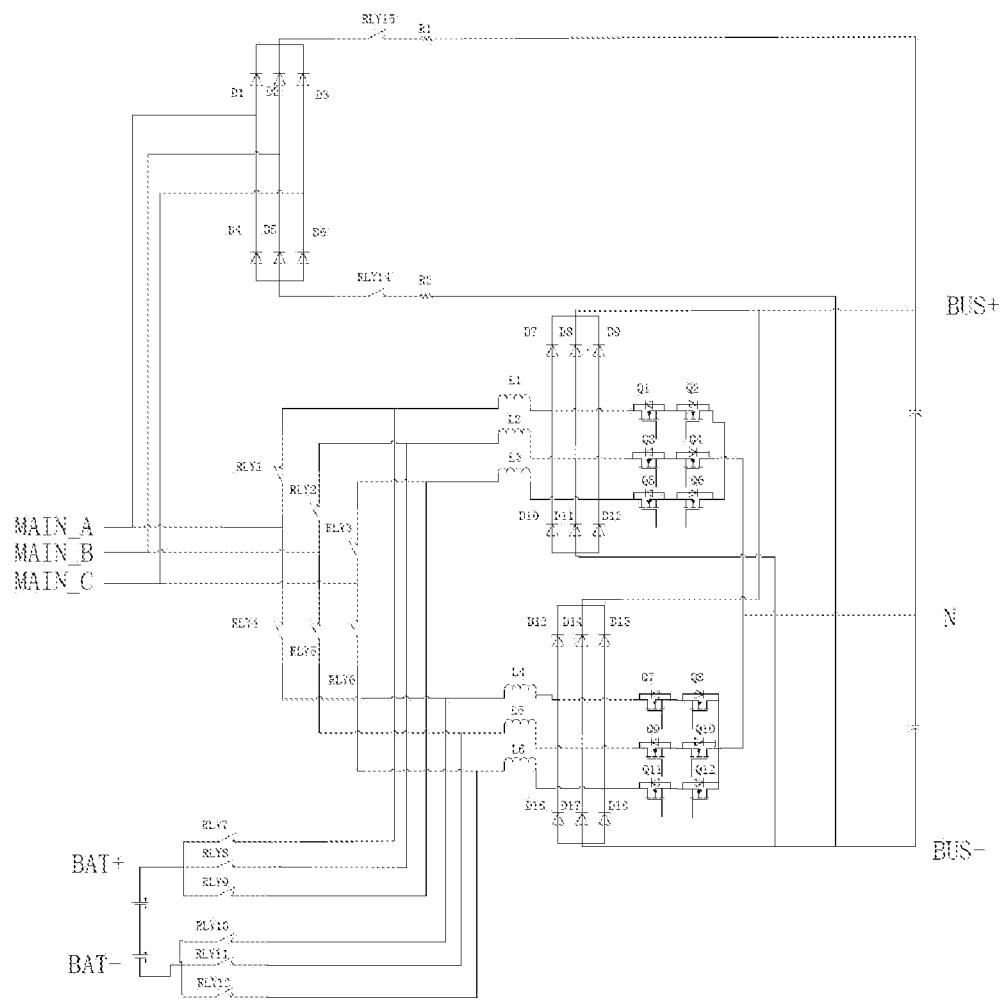
FIG. 3 is a circuit diagram of a soft start circuit of a UPS relay according to another preferred embodiment of the present disclosure.

FIG. 3 is a circuit diagram of a soft start circuit of a UPS relay according to a preferred embodiment of the present disclosure. As shown in FIG. 3, the soft start circuit of the UPS relay according to the present disclosure includes a three-phase pre-charging module, a first A-phase PFC unit, a second A-phase PFC unit, a first B-phase PFC unit, a second B-phase PFC unit, a first C-phase PFC unit, a second C-phase PFC unit, a relay RLY1, a relay RLY2, a relay RLY3, a relay RLY4, a relay RLY5, a relay RLY6, a three-phase input voltage detection module, a bus voltage detection module, a battery starting module and a relay control module.

As shown in FIG. 3, the three-phase pre-charging module 100 includes a diode D1, a diode D2, a diode D3, a diode D4, a diode D5, a diode D6, a relay RLY15 and a relay RLY14. An anode of the diode D1 is connected to the A-phase mains input MAIN_A and a cathode of the diode D4. A cathode of the diode D1 is connected to a cathode of the diode D2, a cathode of the diode D3 and a first end of the relay RLY15. An anode of the diode D2 is connected to the B-phase mains input MAIN_B and a cathode of the diode D5. An anode of the diode D3 is connected to the C-phase mains input MAIN_C and a cathode of the diode D6. An anode of the diode D4 is connected to an anode of the diode D5, an anode of the diode D6 and a first end of the relay RLY14. A second end of the relay RLY15 is connected to the positive bus BUS+ via a resistor R1. A second end of the relay RLY14 is connected to the negative bus BUS− via a resistor R2.

The first A-phase PFC unit includes an inductor L1, a diode D7, a diode D10, a switch tube Q1 and a switch tube Q2. A first end of the inductor L1 is connected to the relay RLY1. A second end of the inductor L1 is connected to an anode of the diode D7, a cathode of the diode D10 and a source of the switch tube Q1. A drain of the switch tube Q1 is connected to a drain of the switch tube Q2. A source of the switch tube Q2 is connected to the N line. A cathode of the diode D7 is connected to the positive bus BUS+. An anode of the diode D10 is connected to the negative bus BUS−.

The first B-phase PFC unit includes an inductor L2, a diode D8, a diode D11, a switch tube Q3 and a switch tube Q4. A first end of the inductor L2 is connected to the relay RLY2. A second end of the inductor L2 is connected to an anode of the diode D8, a cathode of the diode D11 and a source of the switch tube Q3. A drain of the switch tube Q3 is connected to a drain of the switch tube Q4. A source of the switch tube Q4 is connected to the N line. A cathode of the diode D8 is connected to the positive bus BUS+. An anode of the diode D11 is connected to the negative bus BUS−.

The first C-phase PFC unit includes an inductor L3, a diode D9, a diode D12, a switch tube Q5 and a switch tube Q6. A first end of the inductor L3 is connected to the relay RLY3. A second end of the inductor L3 is connected to an anode of the diode D9, a cathode of the diode D12 and a source of the switch tube Q5. A drain of the switch tube Q5 is connected to a drain of the switch tube Q6. A source of the switch tube Q6 is connected to the N line. A cathode of the diode D9 is connected to the positive bus BUS+. An anode of the diode D12 is connected to the negative bus BUS−.

The second A-phase PFC unit includes an inductor L4, a diode D13, a diode D16, a switch tube Q7 and a switch tube Q8. A first end of the inductor L4 is connected to the relay RLY4. A second end of the inductor L4 is connected to an anode of the diode D13, a cathode of the diode D16 and a source of the switch tube Q7. A drain of the switch tube Q7 is connected to a drain of the switch tube Q8. A source of the switch tube Q8 is connected to the N line. A cathode of the diode D13 is connected to the positive bus BUS+. An anode of the diode D16 is connected to the negative bus BUS−.

The second B-phase PFC unit includes an inductor L5, a diode D14, a diode D17, a switch tube Q9 and a switch tube Q10. A first end of the inductor L5 is connected to the relay RLY5. A second end of the inductor L5 is connected to an anode of the diode D14, a cathode of the diode D17 and a source of the switch tube Q9. A drain of the switch tube Q9 is connected to a drain of the switch tube Q10. A source of the switch tube Q10 is connected to the N line. A cathode of the diode D14 is connected to the positive bus BUS+. An anode of the diode D17 is connected to the negative bus BUS−.

The second C-phase PFC unit includes an inductor L6, a diode D15, a diode D18, a switch tube Q11 and a switch tube Q12. A first end of the inductor L6 is connected to the relay RLY6. A second end of the inductor L6 is connected to an anode of the diode D15, a cathode of the diode D18 and a source of the switch tube Q11. A drain of the switch tube Q11 is connected to a drain of the switch tube Q12. A source of the switch tube Q12 is connected to the N line. A cathode of the diode D15 is connected to the positive bus BUS+. An anode of the diode D18 is connected to the negative bus BUS−.

The battery starting module includes a battery power supply, a relay RLY7, a relay RLY8, a relay RLY9, a relay RLY10, a relay RLY11 and a relay RLY12. A first end of the relay RLY7, the relay RLY8 and the relay RLY9 is connected to a positive electrode BAT+ of the battery power supply. A first end of the relay RLY10, the relay RLY11 and the relay RLY12 is connected to a negative electrode BAT− of the battery power supply. A second end of the relay RLY7 is connected to a second end of the relay RLY1, a second end of the relay RLY8 is connected to a second end of the relay RLY2, a second end of the relay RLY9 is connected to a second end of the relay RLY3, a second end of the relay RLY10 is connected to a second end of the relay RLY4, a second end of the relay RLY11 is connected to a second end of the relay RLY5, and a second end of the relay RLY12 is connected to a second end of the relay RLY6.

Figure 4:
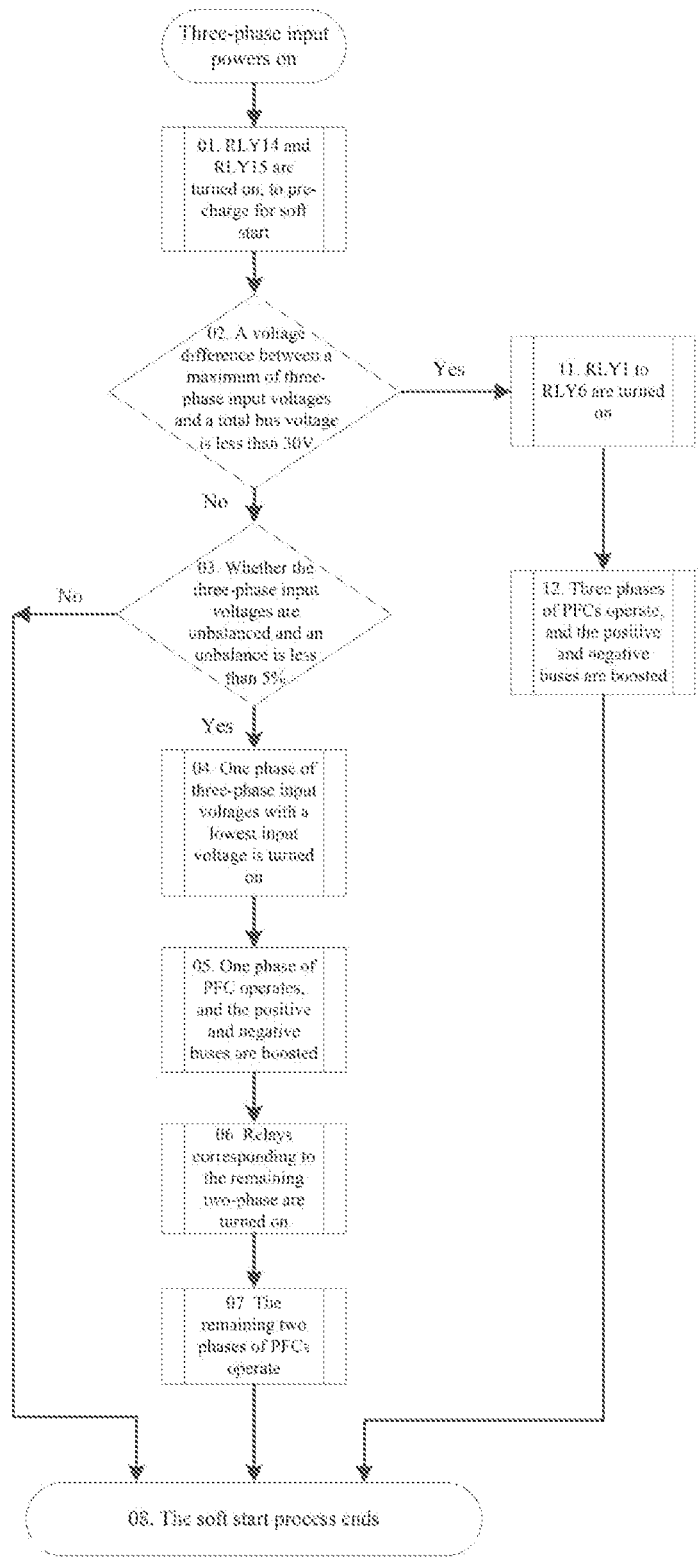
FIG. 4 is a control flow chart of the soft start circuit of the UPS relay shown in FIG. 3 according to a further preferred embodiment.

FIG. 4 is a control flow chart of the soft start circuit of the UPS relay shown in FIG. 3 according to a further preferred embodiment. In the preferred embodiment shown in FIG. 4, an unbalance of a three-phase input voltage is further considered.

A control process is described hereinafter in conjunction with FIG. 3. First, in a normal working condition in which, in step 01, when a three-phase input voltage is balanced, the three-phase pre-charging module 100 starts a mains supply, i.e., the relays RLY14 and RLY15 are turned on. The uncontrolled rectification is realized with the whole circuit.

In order to avoid being damaged by a current impact when an input relay is turned on, in step 02, if a voltage difference between a peak voltage of the A-phase input voltage, the B-phase input voltage and the C-phase input voltage detected by the three-phase input voltage detection module 300 and the bus voltage detected by the bus voltage detection module 500 is within a set range (for example, 30V or the like), step 11 may be executed, i.e., the relay RLY1 and the relay RLY4, the relay RLY2 and the relay RLY5, and the relay RLY3 and the relay RLY6 are controlled to be turned on simultaneously. Then, step 12 is executed, i.e., a PFC wave generation control is performed, so that a bus is boosted to a set range, to realize a soft start. Then, step 08 is executed, i.e., the soft start is controlled to end.

If it is determined in step 02 that the voltage difference between the peak voltage of the A-phase input voltage, the B-phase input voltage and the C-phase input voltage detected by the three-phase input voltage detection module 300 and the bus voltage detected by the bus voltage detection module 500 is out of the set range, step 03 is executed at this time, i.e., an unbalance is calculated. Here, the process for calculating the unbalance is known to those skilled in the art, and the unbalance may be calculated by using the known formula, which is not repeated here. If the unbalance of the A-phase input voltage, the B-phase input voltage and the C-phase input voltage is too large, for example, greater than 5%, step 08 is performed at this time, i.e., the soft start is controlled to end, so as to avoid being damaged by the current impact when the input relay is turned on. If the unbalance of the three-phase input voltage is not too large, i.e., less than or equal to 5%, step 04 is performed at this time, i.e., one phase of the A-phase input voltage, the B-phase input voltage and the C-phase input voltage with a lowest input voltage amplitude is selected, and a relay corresponding thereto is turned on. That is, if the A-phase input voltage is the lowest, the relay RLY1 and the relay RLY4 are selected to be controlled to be turned on. If the B-phase input voltage is the lowest, the relay RLY2 and the relay RLY5 are selected to be controlled to be turned on. If the C-phase input voltage is the lowest, the relay RLY3 and the relay RLY6 are selected to be controlled to be turned on.

Then, step 05 is executed, in which for the phase in which the relay is turned on, the PFC units corresponding to the phase in the first PFC module and second PFC module operate to perform a PWM control. Here, for the PWM control process, any known control process in the conventional technology may be adopted. The bus voltage is boosted to a preset value. Then, step 06 is executed, i.e., after the bus voltage detection module 500 detects that the bus voltage is greater than the three-phase input voltage (i.e., the detected A-phase input voltage, B-phase input voltage and C-phase input voltage), relays corresponding to the remaining two phases are turned on. Then, the remaining two phases of PFC circuits operate, and the soft start process ends.

In this way, compared with the conventional technology with which it is impossible to start or a direct start-up causes an impact on a relay, a body diode of a PFC and a bus capacitor since the input voltage has a relatively wide unbalanced range, with the soft start circuit of the UPS relay according to the present disclosure, the above-mentioned impact current can be reduced, and impact currents of two phases of PFC circuits with higher input voltages can be ensured to be zero, thus greatly improving the reliability of soft start.

Although the present disclosure has been disclosed through the specific embodiments, it should be understood that those skilled in the art can design multiple modifications and equivalents to the present disclosure without departing from the scope of the present disclosure. In addition, various modifications may be made to the present disclosure for specific situations or materials without departing from the scope of the present disclosure. Therefore, the present disclosure is not limited to the disclosed specific embodiments, and should include all embodiments falling within the scope of the claims of the present disclosure.

The foregoing shows only preferred embodiments of the present disclosure and is not intended to limit the present disclosure. Any modifications, equivalent substitutions, improvements and the like made within the spirit and the principle of the present disclosure are all contained in the protection scope of the present disclosure.

The invention claimed is:

1. A soft start circuit of a UPS relay, characterized by comprising a three-phase pre-charging module, a first PFC module, a second PFC module, a relay module, a three-phase input voltage detection module, a bus voltage detection module and a relay control module;

wherein a first end of the relay module is connected to an A-phase mains input, a B-phase mains input and a C-phase mains input respectively, a second end of the relay module is connected to the first PFC module, and a third end of the relay module is connected to the second PFC module, and the first PFC module and the second PFC module are connected to a positive bus, a negative bus and an N line respectively;

a first end of the three-phase pre-charging module is connected to the A-phase mains input, the B-phase mains input and the C-phase mains input respectively, and a second end of the three-phase pre-charging module is connected to the positive bus and the negative bus respectively;

the three-phase input voltage detection module is connected to the A-phase mains input, the B-phase mains input and the C-phase mains input respectively to detect an A-phase input voltage, a B-phase input voltage and a C-phase input voltage;

the bus voltage detection module is connected to the positive bus and the negative bus to detect a bus voltage; and the relay control module is electrically connected to the three-phase input voltage detection module and the bus voltage detection module and controls the connection of the relay module, to control part of relays in the relay module to be turned on based on the A-phase input voltage, the B-phase input voltage, the C-phase input voltage and the bus voltage to soft start the relay.

2. The soft start circuit of the UPS relay according to claim 1, wherein the relay module comprises a first relay, a second relay, a third relay, a fourth relay, a fifth relay and a sixth relay, the first PFC module comprises a first A-phase PFC unit, a first B-phase PFC unit and a first C-phase PFC unit, and the second PFC module comprises a second A-phase PFC unit, a second B-phase PFC unit and a second C-phase PFC unit;

a first end of the first A-phase PFC unit is connected to the A-phase mains input via the first relay, a second end of the first A-phase PFC unit is connected to the N line, a third end of the first A-phase PFC unit is connected to the positive bus, and a fourth end of the first A-phase PFC unit is connected to the negative bus; a first end of the first B-phase PFC unit is connected to the B-phase mains input via the second relay, a second end of the first B-phase PFC unit is connected to the N line, a third end of the first B-phase PFC unit is connected to the positive bus, and a fourth end of the first B-phase PFC unit is connected to the negative bus; a first end of the first C-phase PFC unit is connected to the C-phase mains input via the third relay, a second end of the first C-phase PFC unit is connected to the N line, a third end of the first C-phase PFC unit is connected to the positive bus, and a fourth end of the first C-phase PFC unit is connected to the negative bus; a first end of the second A-phase PFC unit is connected to the A-phase mains input via the fourth relay, a second end of the second A-phase PFC unit is connected to the N line, a third end of the second A-phase PFC unit is connected to the negative bus, and a fourth end of the second A-phase PFC unit is connected to the positive bus; a first end of the second B-phase PFC unit is connected to the B-phase mains input via the fifth relay, a second end of the second B-phase PFC unit is connected to the N line, a third end of the second B-phase PFC unit is connected to the negative bus, and a fourth end of the second B-phase PFC unit is connected to the positive bus; a first end of the second C-phase PFC unit is connected to the C-phase mains input via the sixth relay, a second end of the second C-phase PFC unit is connected to the N line, a third end of the second C-phase PFC unit is connected to the negative bus, and a fourth end of the second C-phase PFC unit is connected to the positive bus;

the relay control module is electrically connected to the three-phase input voltage detection module and the bus voltage detection module and controls the connection of the first relay and the fourth relay, the second relay and the fifth relay, and the third relay and the sixth relay, to control the first relay and the fourth relay, the second relay and the fifth relay, and the third relay and the sixth relay to be turned on based on the A-phase input voltage, the B-phase input voltage, the C-phase input voltage and the bus voltage.

3. The soft start circuit of the UPS relay according to claim 2, wherein the three-phase pre-charging module comprises a first diode, a second diode, a third diode, a fourth diode, a fifth diode, a sixth diode, a seventh relay and an eighth relay, an anode of the first diode is connected to the A-phase mains input and a cathode of the fourth diode, a cathode of the first diode is connected to a cathode of the second diode, a cathode of the third diode and a first end of the seventh relay, an anode of the second diode is connected to the B-phase mains input and a cathode of the fifth diode, an anode of the third diode is connected to the C-phase mains input and a cathode of the sixth diode, an anode of the fourth diode is connected to an anode of the fifth diode, an anode of the sixth diode and a first end of the eighth relay, a second end of the seventh relay is connected to the positive bus, and a second end of the eighth relay is connected to the negative bus.

4. The soft start circuit of the UPS relay according to claim 2, wherein the first A-phase PFC unit comprises a first inductor, a seventh diode, an eighth diode, a first switch tube and a second switch tube, a first end of the first inductor is connected to the first relay, a second end of the first inductor is connected to an anode of the seventh diode, a cathode of the eighth diode and a source of the first switch tube, a drain of the first switch tube is connected to a drain of the second switch tube, a source of the second switch tube is connected to the N line, a cathode of the seventh diode is connected to the positive bus, and an anode of the eighth diode is connected to the negative bus.

5. The soft start circuit of the UPS relay according to claim 2, wherein the first B-phase PFC unit comprises a second inductor, a ninth diode, a tenth diode, a third switch tube and a fourth switch tube, a first end of the second inductor is connected to the second relay, a second end of the second inductor is connected to an anode of the ninth diode, a cathode of the tenth diode and a source of the third switch tube, a drain of the third switch tube is connected to a drain of the fourth switch tube, a source of the fourth switch tube is connected to the N line, a cathode of the ninth diode is connected to the positive bus, and an anode of the tenth diode is connected to the negative bus.

6. The soft start circuit of the UPS relay according to claim 2, wherein the first C-phase PFC unit comprises a third inductor, an eleventh diode, a twelfth diode, a fifth switch tube and a sixth switch tube, a first end of the third inductor is connected to the third relay, a second end of the third inductor is connected to an anode of the eleventh diode, a cathode of the twelfth diode and a source of the fifth switch tube, a drain of the fifth switch tube is connected to a drain of the sixth switch tube, a source of the sixth switch tube is connected to the N line, a cathode of the eleventh diode is connected to the positive bus, and an anode of the twelfth diode is connected to the negative bus.

7. The soft start circuit of the UPS relay according to claim 2, wherein the second A-phase PFC unit comprises a fourth inductor, a thirteenth diode, a fourteenth diode, a seventh switch tube and an eighth switch tube, a first end of the fourth inductor is connected to the fourth relay, a second end of the fourth inductor is connected to an anode of the thirteenth diode, a cathode of the fourteenth diode and a source of the seventh switch tube, a drain of the seventh switch tube is connected to a drain of the eighth switch tube, a source of the eighth switch tube is connected to the N line, a cathode of the thirteenth diode is connected to the positive bus, and an anode of the fourteenth diode is connected to the negative bus.

8. The soft start circuit of the UPS relay according to claim 2, wherein the second B-phase PFC unit comprises a fifth inductor, a fifteenth diode, a sixteenth diode, a ninth switch tube and a tenth switch tube, a first end of the fifth inductor is connected to the fifth relay, a second end of the fifth inductor is connected to an anode of the fifteenth diode, a cathode of the sixteenth diode and a source of the ninth switch tube, a drain of the ninth switch tube is connected to a drain of the tenth switch tube, a source of the tenth switch tube is connected to the N line, a cathode of the fifteenth diode is connected to the positive bus, and an anode of the sixteenth diode is connected to the negative bus.

9. The soft start circuit of the UPS relay according to claim 2, wherein the second C-phase PFC unit comprises a sixth inductor, a seventeenth diode, an eighteenth diode, an eleventh switch tube and a twelfth switch tube, a first end of the sixth inductor is connected to the sixth relay, a second end of the sixth inductor is connected to an anode of the seventeenth diode, a cathode of the eighteenth diode and a source of the eleventh switch tube, a drain of the eleventh switch tube is connected to a drain of the twelfth switch tube, a source of the twelfth switch tube is connected to the N line, a cathode of the seventeenth diode is connected to the positive bus, and an anode of the eighteenth diode is connected to the negative bus.

10. The soft start circuit of the UPS relay according to claim 2, further comprising a battery starting module, wherein the battery starting module comprises a battery power supply, a ninth relay, a tenth relay, an eleventh relay, a twelfth relay, a thirteenth relay and a fourteenth relay, a first end of the ninth relay, the tenth relay and the eleventh relay is connected to a positive electrode of the battery power supply, a first end of the twelfth relay, the thirteenth relay and the fourteenth relay is connected to a negative electrode of the battery power supply, a second end of the ninth relay is connected to a second end of the first relay, a second end of the tenth relay is connected to a second end of the second relay, a second end of the eleventh relay is connected to a second end of the third relay, a second end of the twelfth relay is connected to a second end of the fourth relay, a second end of the thirteenth relay is connected to a second end of the fifth relay, and a second end of the fourteenth relay is connected to a second end of the sixth relay.

11. The soft start circuit of the UPS relay according to claim 2, wherein the relay control module comprises a first comparator, a second comparator and a relay controller, an input end of the first comparator receives the A-phase input voltage, the B-phase input voltage and the C-phase input voltage to output a first comparison result, and an input end of the second comparator is connected to the A-phase input voltage, the B-phase input voltage, the C-phase input voltage and the bus voltage to output a second comparison result;
the relay controller controls the first relay and the fourth relay, the second relay and the fifth relay, and the third relay and the sixth relay to be turned on simultaneously or at intervals based on the first comparison result and the second comparison result.

12. A control method for a soft start circuit of a UPS relay, wherein the soft start circuit comprising a three-phase pre-charging module, a first PFC module, a second PFC module, a relay module, a three-phase input voltage detection module, a bus voltage detection module and a relay control module, the control method characterized by comprising:

when voltage difference between the peak voltage of the A-phase input voltage, the B-phase input voltage and the C-phase input voltage detected by the three-phase input voltage detection module and the bus voltage detected by the bus voltage detection module is out of a set range, the relay control module selecting relays in the relay module corresponding to one phase of the A-phase input voltage, the B-phase input voltage and the C-phase input voltage with a lowest voltage amplitude to be turned on based on the detected A-phase input voltage, B-phase input voltage and C-phase input voltage;
the PFC units corresponding to the selected one phase in the first PFC module and second PFC module operating, and boosting the bus voltage to a preset value; and
after the bus voltage detection module detects that the bus voltage is greater than the detected A-phase input voltage, B-phase input voltage and C-phase input voltage, turning on relays corresponding to the remaining two phases, and the PFC units corresponding to the remaining two phases operating.

13. The control method according to claim 12, further comprising:
when voltage difference between the peak voltage of the A-phase input voltage, the B-phase input voltage and the C-phase input voltage detected by the three-phase input voltage detection module and the bus voltage detected by the bus voltage detection module is out of a set range, calculating an unbalance; and
if the unbalance of the A-phase input voltage, the B-phase input voltage and the C-phase input voltage is greater than a predetermined threshold, controlling the soft start end, or if the unbalance of the A-phase input voltage, the B-phase input voltage and the C-phase input voltage is less than or equal to the predetermined threshold, selecting relays in the relay module corresponding to one phase of the A-phase input voltage, the B-phase input voltage and the C-phase input voltage with a lowest voltage amplitude to be turned on.

* * * * *